US008789751B2

(12) United States Patent
Han

(10) Patent No.: US 8,789,751 B2
(45) Date of Patent: Jul. 29, 2014

(54) MEDIUM PROCESS APPARATUS AND FINANCIAL DEVICE

(75) Inventor: Seung Oh Han, Seoul (KR)

(73) Assignee: LG CNS Co., Ltd., Seoul (KR)

( * ) Notice: Subject to any disclaimer, the term of this patent is extended or adjusted under 35 U.S.C. 154(b) by 576 days.

(21) Appl. No.: 13/044,176

(22) Filed: Mar. 9, 2011

(65) Prior Publication Data

US 2011/0221426 A1 Sep. 15, 2011

(30) Foreign Application Priority Data

Mar. 9, 2010 (KR) ........................ 10-2010-0020830

(51) Int. Cl.

| | |
|---|---|
| ***G06Q 40/00*** | (2012.01) |
| ***G07D 11/00*** | (2006.01) |
| ***G07F 19/00*** | (2006.01) |
| ***G06K 7/08*** | (2006.01) |

(52) U.S. Cl.
CPC ...................................... *G07F 19/20* (2013.01)
USPC ............................ 235/379; 235/449; 235/381

(58) Field of Classification Search
CPC ......... G06K 7/084; G06K 7/08; G06K 17/00; G06K 2017/0041; G06K 7/083
USPC ................................. 235/379, 381, 449, 380
See application file for complete search history.

(56) References Cited

U.S. PATENT DOCUMENTS

| | | | | |
|---|---|---|---|---|
| 3,370,157 | A | 2/1968 | Lockey | |
| 5,003,423 | A * | 3/1991 | Imamura et al. | 360/125.03 |
| 6,394,348 | B1 * | 5/2002 | Tratar et al. | 235/449 |
| 2004/0236691 | A1 | 11/2004 | Force et al. | |
| 2005/0023342 | A1 * | 2/2005 | Yamamiya | 235/381 |
| 2010/0271619 | A1 | 10/2010 | Lohner | |

FOREIGN PATENT DOCUMENTS

DE 10-2007-062122 A1 6/2009

OTHER PUBLICATIONS

Office Action dated May 25, 2012 in German Application No. 201110005221, filed Mar. 8, 2011.
Office Action dated May 14, 2014 in German Appliction No. 102011005221.6.

* cited by examiner

*Primary Examiner* — Thien T Mai
(74) *Attorney, Agent, or Firm* — Saliwanchik, Lloyd & Eisenschenk

(57) ABSTRACT

A medium process apparatus is provided. The medium process apparatus comprises a state detection unit configured to detect a state of a transferring medium and a support unit configured to support the transferring medium. The support unit comprises a plurality of support parts successively disposed in a transfer direction of the medium. The plurality of support parts comprise a second support part facing the state detection unit and a first support part disposed at a front or rear side of the second support part in the transfer direction of the medium.

19 Claims, 8 Drawing Sheets

MEDIUM PROCESS APPARATUS AND FINANCIAL DEVICE

CROSS-REFERENCE TO RELATED APPLICATION

The present application claims the benefit under 35 U.S.C. 119 of Korean Patent Application No. 10-2010-0020830, filed on Mar. 9, 2010, which is hereby incorporated by reference in its entirety.

BACKGROUND OF THE INVENTION

Field of the Invention

Embodiments relate to a medium process apparatus and a financial device.

Generally, a financial device is a device for processing a financial business desired by a user. The financial device can deposit or withdraw a medium or automatically transfer the medium. The financial device may comprise a medium process apparatus for processing the medium.

The medium process apparatus may detect the transferring medium using a sensor to determine whether the medium is genuine.

For example, a magnetic resistance sensor may be used as the sensor constituting the medium process apparatus. The magnetic resistance sensor may detect magnetism comprised in the medium.

BRIEF SUMMARY

Embodiments provide a medium process apparatus and a financial device which accurately determines whether a medium is genuine.

In one embodiment, a medium process apparatus comprises: a state detection unit configured to detect a state of a transferring medium; and a support unit configured to support the transferring medium, wherein the support unit comprises a plurality of support parts successively disposed in a transfer direction of the medium, wherein the plurality of support parts comprises a second support part facing the state detection unit and a first support part disposed at a front or rear side of the second support part in the transfer direction of the medium.

In another embodiment, a medium process apparatus comprises: a state detection unit configured to detect a state of a transferring medium; and support unit configured to compress the transferring medium toward the state detection unit, wherein the medium passes between the state detection unit and the support unit, the support unit contacts the state detection unit before the medium is supported by the support unit, the support unit is spaced from the state detection unit in a state where the support unit supports the medium, and the support unit is spaced from the state detection unit when the medium is not disposed between the state detection unit and the support unit in the state where the support unit supports the medium.

In further another embodiment, a financial device comprises: a transfer path configured to transfer a medium; and a medium process apparatus configured to detect a state of the medium on the transfer path, wherein the medium process apparatus comprises: a state detection unit configured to detect a state of the medium; a support unit configured to compress the medium toward the state detection unit; an installation part on which the support unit is rotatably disposed; and an elastic member configured to apply an elastic force to the support unit disposed on the installation part, wherein the support unit comprises a plurality of support parts successively disposed in a transfer direction of the medium, and one support part of the plurality of support parts faces the state detection unit.

The details of one or more embodiments are set forth in the accompanying drawings and the description below. Other features will be apparent from the description and drawings, and from the claims.

DETAILED DESCRIPTION

Figure 1:
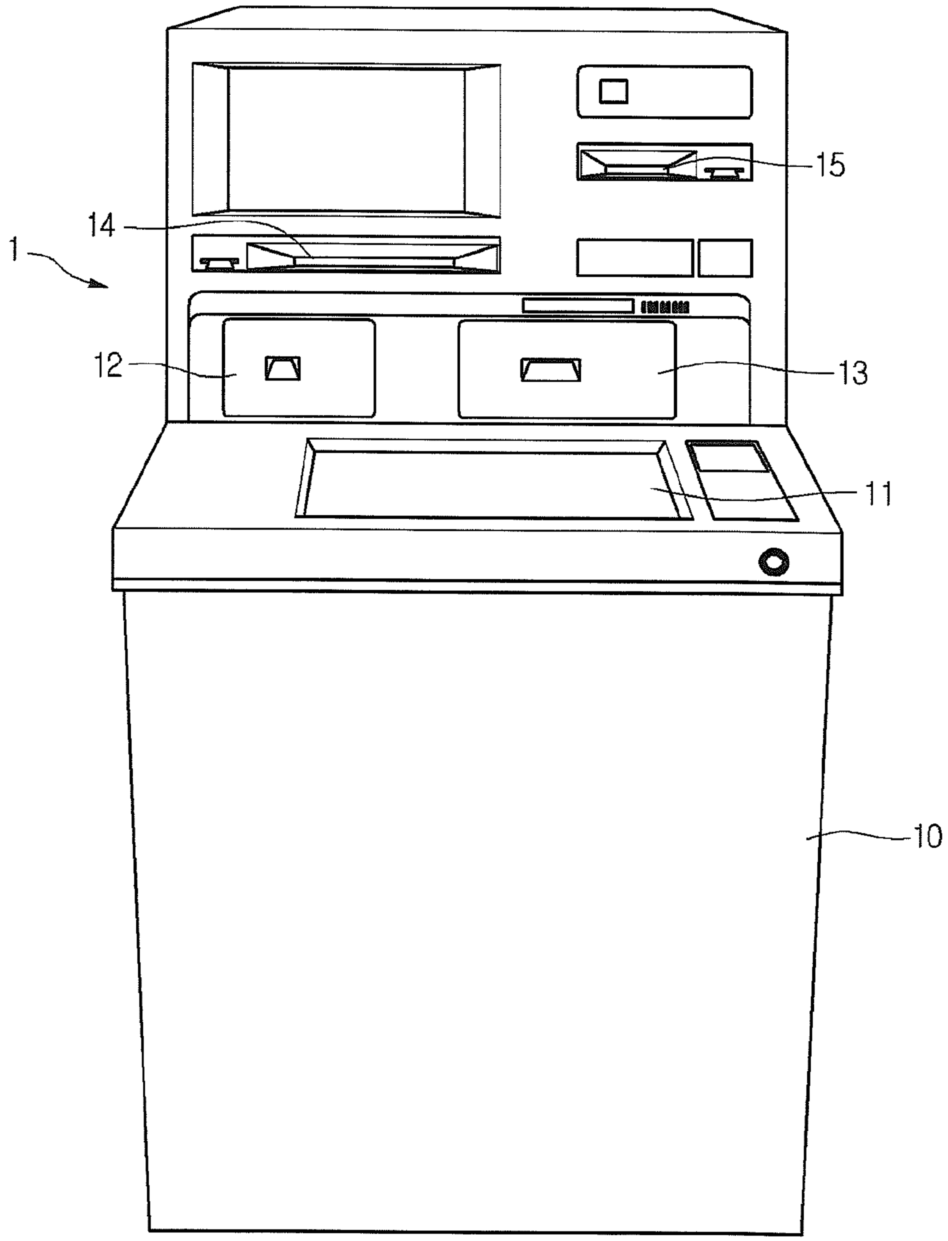
FIG. 1 is a perspective view of an automatic teller machine (ATM) according to an embodiment.

Hereinafter, exemplary embodiments of the present disclosure will be described with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is “connected,” “coupled” or “joined” to another component, the former may be directly “connected,” “coupled,” and “joined” to the latter or “connected”, “coupled”, and “joined” to the latter via another component.

A financial device according to embodiments is a device that performs financial businesses, i.e., medium processing including processing such as deposit processing, giro receipt, or gift certificate exchange and/or processing such as withdrawal processing, giro dispensing, or gift certificate dispensing by receiving various media such as, e.g., paper moneys, bills, giros, coins, gift certificates, etc. For example, the financial device may comprise an automatic teller machine (ATM) such as a cash dispenser (CD) or a cash recycling device. However, the financial device is not limited to the above-described examples. For example, the financial device may be a device for automatically performing the financial businesses such as a financial information system (FIS).

Hereinafter, assuming that the financial device is the ATM, an embodiment will be described. However, this assumption is merely for convenience of description, and technical idea of the present disclosure is not limited to the ATM.

Figure 2:
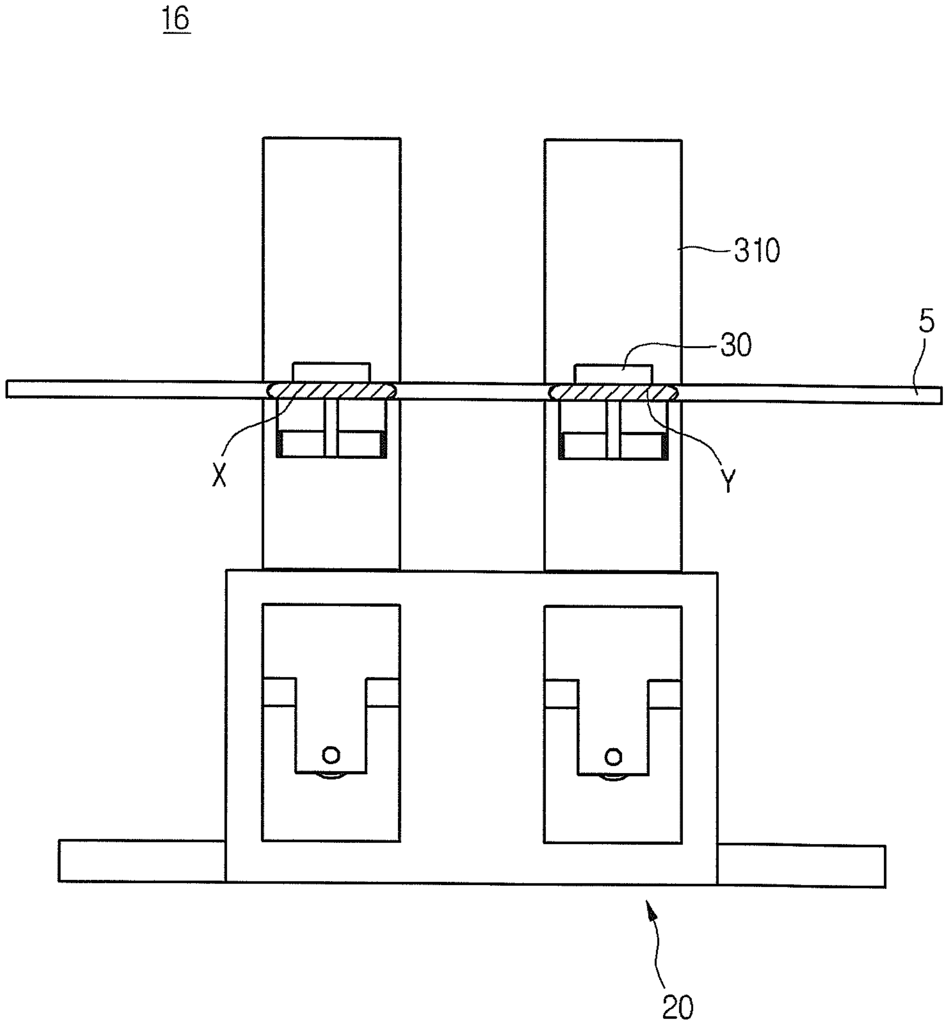
FIG. 2 is a front view of a medium process apparatus according to an embodiment.

FIG. 1 is a perspective view of an automatic teller machine (ATM) according to an embodiment, and FIG. 2 is a front view of a medium process apparatus according to an embodiment.

Referring to FIGS. 1 and 2, a medium process apparatus 16 according to the current embodiment, for example, may be disposed in an automatic teller machine (ATM) 1. However, only the medium process apparatus according to the current embodiment may be independently installed at a place where media are traded. One or more medium process apparatuses may be provided in the automatic teller machine (ATM). For example, the medium process apparatus 16 may detect whether the medium is genuine.

The automatic teller machine (ATM) 1 comprises a main body 10 in which the medium process apparatus 16 is received therein. The main body 10 comprises an input 11 through which a user processes financial businesses, a check entrance 12 for depositing or withdrawing a check, a paper money entrance 13 for depositing or withdrawing a paper money, a bankbook insertion slot 14 for accessing a bankbook, and a card insertion slot 15 for accessing a card. Since the automatic teller machine (ATM) may have the same structure as the known structure, detailed description thereof will be omitted. In the specification, one or more of the check entrance 12, the bankbook insertion slot 14, and the card insertion slot 15 may be omitted. Also, in the specification, the entrance through which the medium is accessible such as the check entrance 12 and the paper money entrance 13 may be commonly called a medium entrance.

Hereinafter, the medium process apparatus 16 according to the current embodiment will be described in detail.

Figure 3:
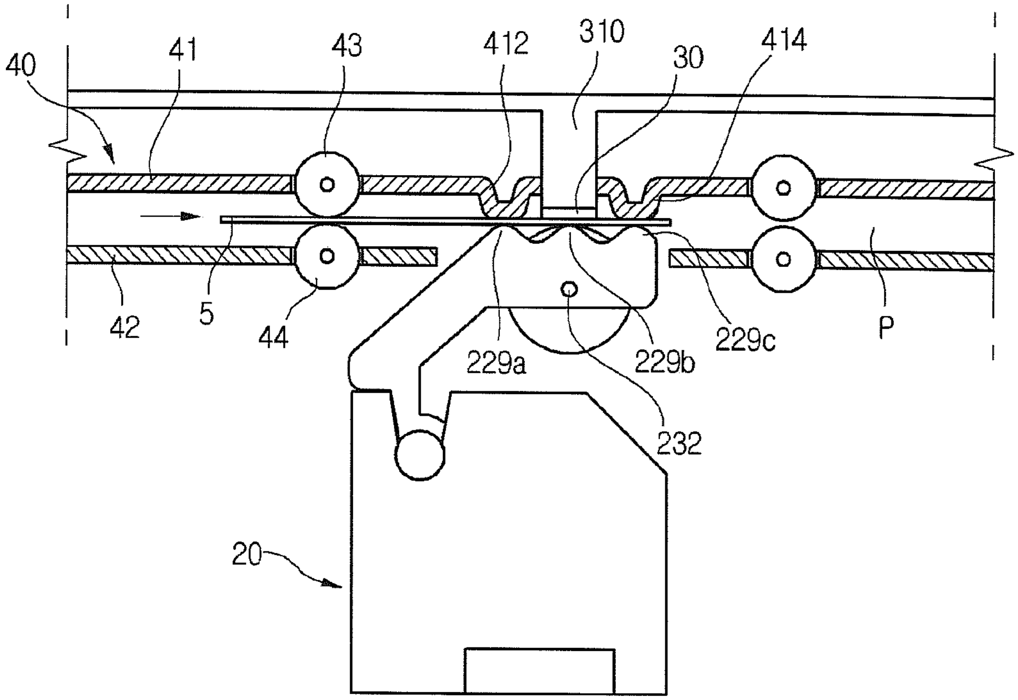
FIG. 3 is a side view illustrating a state in which the medium process apparatus is installed according to an embodiment.
Figure 4:
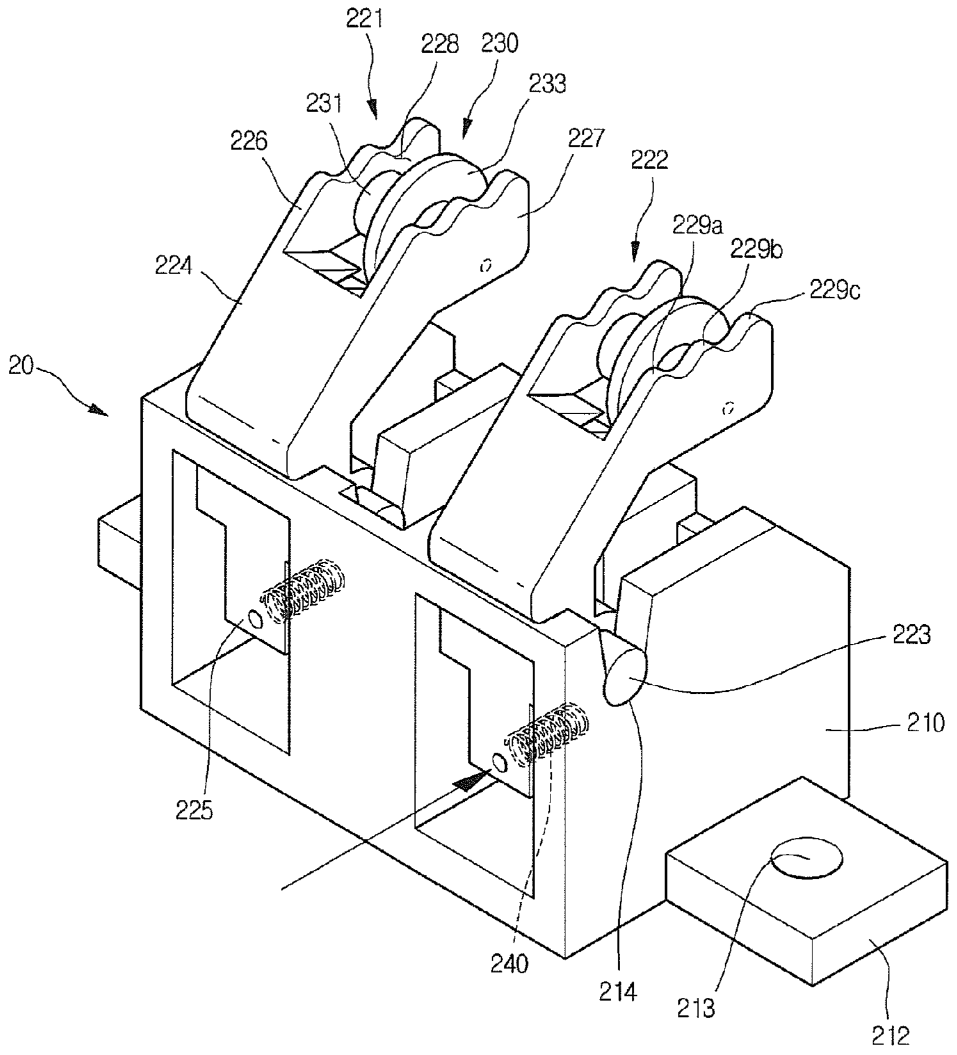
FIG. 4 is a perspective view of a support unit constituting the medium process apparatus according to an embodiment.

FIG. 3 is a side view illustrating a state in which the medium process apparatus 16 is installed according to an embodiment, and FIG. 4 is a perspective view of a support device constituting the medium process apparatus 16 according to an embodiment.

Referring to FIGS. 1 to 4, the medium process apparatus 16 according to the current embodiment comprises a support device 20 for supporting a transferring medium 5 and a state detection unit for detecting a state of the transferring medium 5.

For example, the state detection unit may comprise one or more magnetic resistance sensor 30 (hereinafter, referred to as a "sensor" for convenience of description) for detecting magnetism of the medium (e.g., X and Y regions of the medium). In the current embodiment, although the state detection unit of the medium process apparatus 16 detects the magnetism of the medium, the state detection unit may detect magnetism of an object except the medium.

The support device 20 is disposed under the sensor 30 to support the transferring medium 5. Alternatively, the support device 20 may be disposed above the sensor 30 or on a side of the sensor 30 to compress the medium 5 toward the sensor 30.

The medium 5 passes between the support device 20 and the sensor 30. The support device 20 comprises an installation part 210 disposed inside the main body 10, one or more support units 221 and 222 rotatably supported by the installation part 210, and a rotation member 230 rotatably supported by the one or more support units 221 and 222 and contacting the transferring medium 5.

The support units 221 and 222 may be provided in plurality to stably support the medium 5. In the current embodiment, for example, two support units 221 and 222 are provided. Alternatively, one support unit may be provided to support the medium 5.

The installation part 210 comprises a fixed plate 212 fixed to a specific position of the main body 10. A coupling hole 213 to which a coupling member such as a screw is coupled is defined in the fixed plate 212. A shaft seat part 214 on which a shaft 223 of each of the support units 221 and 222 is seated is disposed above the installation part 210.

The support units 221 and 222 are disposed on the installation part 210 at positions spaced from each other. Each of the support units 221 and 222 may be independently rotated. Alternatively, the support units 221 and 222 may be rotated around a common shaft.

Each of the support units 221 and 222 comprises the shaft 223 providing a rotation center, a first extension part 224 extending upward from the shaft 223, and a second extension part 225 extending downward from the shaft 223. The first extension part 224 comprises a plurality of supporters 226 and 227 connected to the rotation member 230. The plurality of supporters 226 and 227 comprise a first supporter 226 and a second supporter 227.

The plurality of supporters 226 and 227 are spaced from each other. A space 228 in which the rotation member 230 is disposed is defined between the plurality of supporters 226 and 227. The medium 5 may be substantially supported by top surfaces of the plurality of supporters 226 and 227.

Each of the supporters 226 and 227 comprises a plurality of support parts. In detail, the plurality of support parts comprises first to third support parts 229*a*, 229*b*, and 229*c* disposed in a direction parallel to a transfer direction of the medium 5. The first to third support parts 229*a*, 229*b*, and 229*c* may be disposed spaced from each other in the direction parallel to the transfer direction of the medium 5. The medium 5 contacts the first support part 229*a* (a front support part) firstly. Then, the medium 5 contacts the second support part 229*b* (an intermediate support part) and the third support part (a rear support part) in order. The second support part 229*b* is disposed directly under the sensor 30. That is, the second support part 229*b* is disposed facing the sensor 30. Here, the second support part 229*b* may contact or be spaced from the sensor 30. Each of the support parts may have a rounded or inclined end. For example, each of the support parts may be rounded in a convex shape from each of the supporters toward the sensor. Alternatively, each of the support parts may protrude from each of the supporters toward the sensor and has one or more inclined surfaces. When each of the support parts has a plurality of inclined surfaces, the plurality of inclined surfaces may comprise a first inclined surface inclined upward from a front side toward a rear side with respect to the transfer direction of the medium and a second inclined surface inclined downward from a rear side of the first inclined surface.

When the medium 5 is transferred, a transfer force of the medium 5 is transmitted into the rotation member 230 contacting the medium 5 to rotate the rotation member 230. That is, the rotation member 230 is rotated by friction against the medium 5.

The rotation member 230 comprises a rotation body 231 rotatably connected to the plurality of supporters 226 and 227 by a rotation shaft 232. The rotation body 231 may comprise at least contact part 233 protruding in a circumferential direction of the rotation body 231 to contact the transferring medium 5. Alternatively, the contact part 233 may not be provided to the rotation body 231. The plurality of supporters 226 and 227 and the contact part 223 support the medium 5. The contact part 233 may be disposed at a position bisecting the rotation body 231 in an extending direction of the rotation body 231 to stably support the medium 5.

A vertical distance from the rotation shaft 232 to the second support part 229*b* of the supporters 226 and 227 may be substantially equal to a radius of the rotation body 231 at a portion of the contact part 233 so that the plurality of supporters 226 and 227 and the contact part 233 simultaneously support the medium 5.

The second extension part 225 is connected to an elastic member 240 pulling the second extension part 225 in an arrow direction of FIG. 4. When the medium 5 is transferred, the medium 5 may compress the plurality of supporters 226 and 227 and the contact part 233. When the plurality of supporters 226 and 227 or the contact part 233 are (is) compressed, the support units 221 and 222 may be rotated in a clockwise direction using the shaft 223 as a rotation center when viewed in FIG. 3. Thus, the elastic member 240 may be extended. Also, when a force compressing the supporters 226 and 227 or the contact part 233 is removed, the support units 221 and 222 may return to its original position by a restoring force of the elastic member 240. For example, the elastic member may be a compression or tension coil spring or a torsion coil spring connected to the shaft.

For another example, each of the support units 221 and 222 may comprise a shaft providing a rotation center and an extension part extending from the shaft. Also, a plurality of support parts may be disposed on the extension part. In this case, the elastic member may be connected to the support units 221 and 222 to apply an elastic force to the support units 221 and 222.

The sensor 30 may have the same number as the support units 221 and 222. For example, the medium process apparatus 16 comprises two sensors 30 in FIG. 2.

The sensor 30 may be protected by a sensor housing 310. The sensor 30 may be disposed on a transfer path P of the medium 5. When the second support part 229*b* is configured to contact the sensor 5, the second support part 229*b* may contact the sensor 30 before the medium 5 passes through the support device 20 (before the medium 5 contacts the first support part 229*a*).

The medium process apparatus 16 may further comprise first and second guides 412 and 414 for guiding the transfer of the medium passing through the support device 20.

The first guide 412 is disposed at a front side of the sensor 30 with respect to a transfer direction of the medium 5, and the second guide 414 is disposed at a rear side of the sensor 30. Also, a guide surface (a surface contacting the medium) of each of the guides 412 and 414 may be disposed on the same level as a medium contact surface of the sensor 30. That is, the guide surface of each of the guides 412 and 414 and the medium contact surface of the sensor 30 may be parallel to the transfer direction of the medium. The first guide 412 is disposed facing the first support part 229*a*, and the second guide 414 is disposed facing the third support part 229*c*.

For example, each of the guides 412 and 414 may be rounded in a convex shape toward the corresponding support part. Alternatively, each of the guides 412 and 414 may have one or more inclined surfaces. When each of the guides has a plurality of inclined surfaces, the plurality of inclined surfaces may comprise a first inclined surface inclined downward from a front side toward a rear side with respect to the transfer direction of the medium and a second inclined surface inclined upward from a rear side of the first inclined surface.

The first guide 412 and the first support part 229*a* may allow the second support part 229*b* to be spaced from the sensor 30 when the medium 5 passes through the first support part 229*a*. Also, the second guide 414 and the third support part 229*b* may maintain the state in which the second support part 229*b* is spaced from the sensor 30 before the medium 5 completely passes through the third support part 229*c*. If the second support part 229*b* does not contact the sensor 30, a spaced distance between the sensor 30 and the second support part 229*b* before the medium is not transferred may be a distance L1. Here, the first guide 412 and the first support part 229*a* may increase the spaced distance (an increased spaced distance L2) when the medium 5 passes through the first support part 229*a*. Also, the second guide 414 and the third support part 229*b* may maintain the state in which a spaced distance between the second support part 229*b* and the sensor 30 is a distance L2 before the medium 5 completely passes through the third support part 229*c*.

The sensor 30 detects magnetism of the medium 5 transferred while contacting the support device 20. The detected information is transmitted into a control unit (not shown). The medium 5 passes between the sensor 30 and the support device 20 in a state where the medium 5 contacts the sensor 30 by the support device 20.

A component having the magnetism is disposed in one or more magnetic regions X and Y of the medium 5. Each of the sensors 30 detects the magnetism of the magnetic regions X and Y of the medium 5. Each of the sensors 30 may detect a magnetic component, i.e., a magnetic flux change of the medium 5. Thus, data according to the magnetic flux change is outputted from each of the sensors 30.

When whether the medium is genuine is determined, it should prevent a paper dust of the medium containing the magnetic component from be added to the medium 5, thereby preventing a determination mistake.

In the current embodiment, when the medium 5 is transferred, the contact part 233 of the rotation member 230 is frictionized with the medium 5 to rotate the rotation member 230. Here, since the contact part 233 has a width less than that of the rotation body 231, that the paper dust of the medium 5 is smeared on the contact part 233 may be minimized.

Even though the paper dust is smeared on the contact part 233, since the rotation member 230 is rotated, the paper dust on the contact part 233 falls down from the contact part 233. Thus, it may prevent the paper dust from remaining on the contact part 233. When the paper dust does not remain on the contact part 233, since it prevents the paper dust on the contact part 233 from being added to the medium 5, sensing accuracy of the sensor 30 may be increased.

Also, according to the current embodiment, since the contact part 223 in addition to the plurality of supporters 226 and 227 supports the medium 5, it may prevent the medium 5 from being bent (e.g., hanging down) at a portion between the plurality of supporters 226 and 227. Thus, the medium 5 may be smoothly transferred, and the decrease of the sensing accuracy of the sensor 30 may be prevented. Here, the above-described determination method may be exemplary, and thus, various methods may be applicable to the current embodiment.

Additionally, the medium process apparatus 16 may further comprise a transfer device 40 for transferring the medium 5.

The transfer device 40 may comprise a first path formation part 41 and a second path formation part 42, which constitute a path through which the medium 5 is transferred.

Also, the transfer device 40 may comprise a plurality of rollers 43 and 44 spaced from each other. The medium 5 passes between the plurality of rollers 43 and 44. At least one portion of the sensor 30 may be disposed between the first path formation part 41 and the second path formation part 42. Alternatively, at least one portion of the sensor 30 may be disposed between the guides 412 and 414.

Each of the guides 412 and 414 may be integrated with the first path formation part 41. Also, each of the guides 412 and 414 may protrude from the first path formation part 41 toward the second path formation part 42. On the other hand, each of the guides 412 and 414 may be detachably coupled to the first path formation part 41. Alternatively, the first and second guides 412 and 414 may be integrated with the sensor housing 310 or coupled to the sensor housing 310. Alternatively, when the sensor 30 and the support device 20 are exchanged with each other in position, each of the guides 412 and 414 may be integrated with the second path formation part 42 or coupled to the second path formation part 42.

Hereinafter, an operation of the support device when the medium is transferred will be described.

Figure 5:
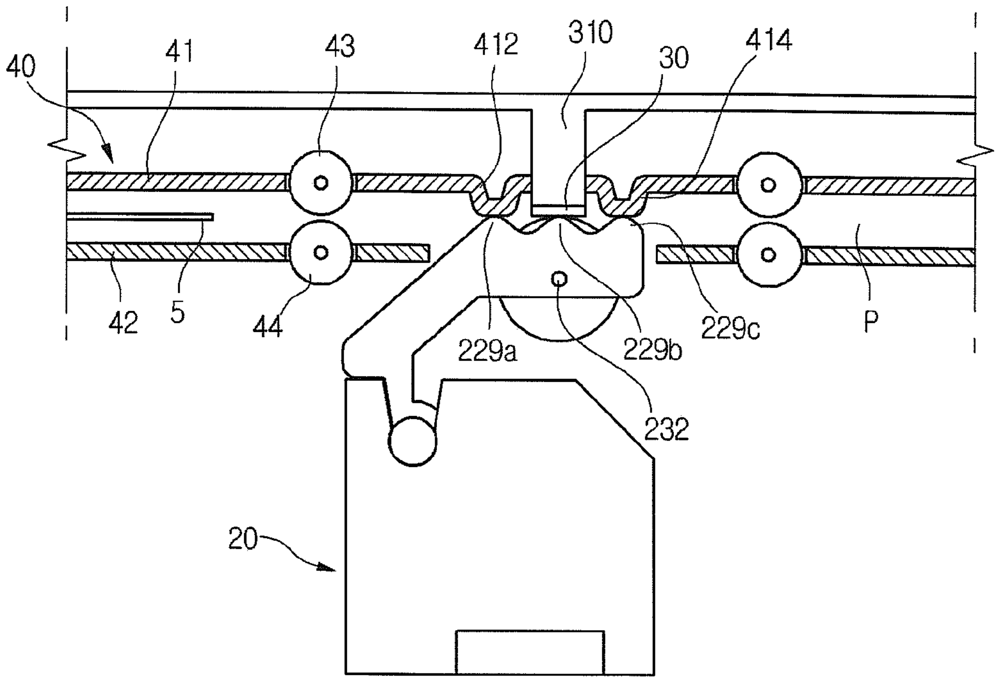
FIGS. 5 to 7 are views illustrating a state in which a medium is transferred.
Figure 6:
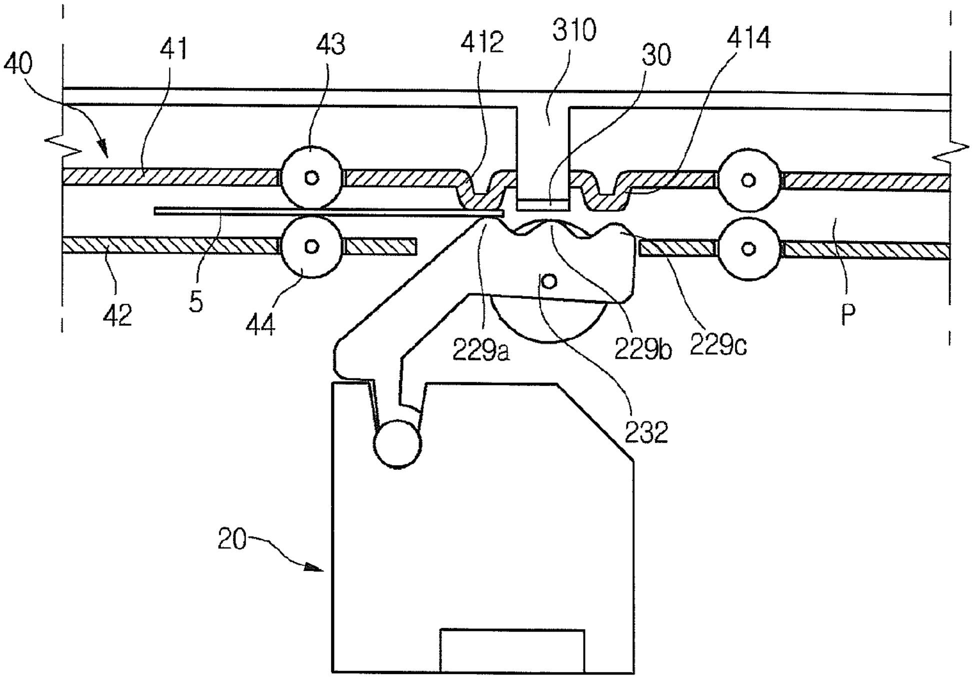
Figure 7:
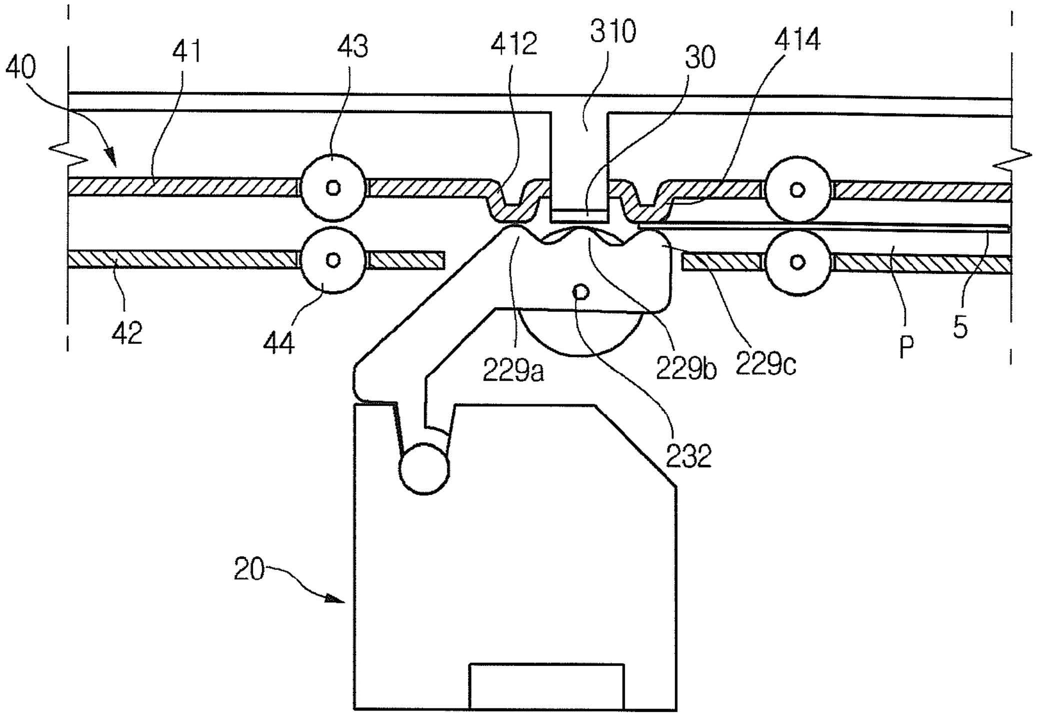
Figure 8:
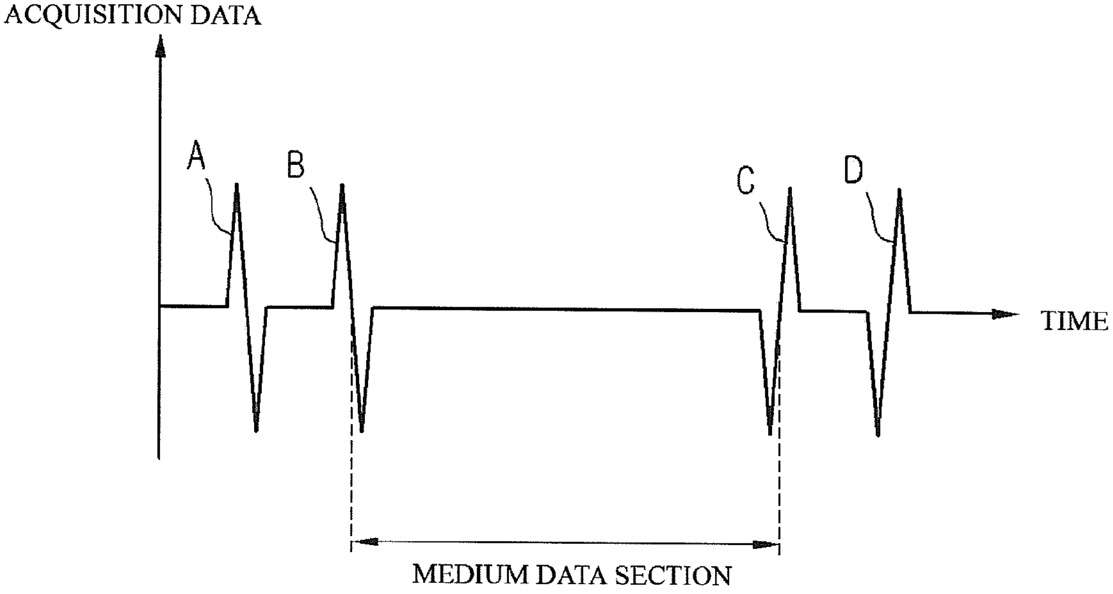
FIG. 8 is a graph illustrating a waveform of data outputted from a sensor when the medium is transferred.

FIGS. 5 to 7 are views illustrating a state in which a medium is transferred, and FIG. 8 is a graph illustrating a waveform of data outputted from a sensor when the medium is transferred.

In FIG. 8, a horizontal axis represents a time, and a vertical axis represents a degree of a magnetic flux change.

Referring to FIGS. 1 to 8, when the medium 5 is inserted into the automatic teller machine (ATM) 1, the inserted medium 5 is transferred by the transfer device 40. The second support part 229*b* may maintain a state in which it contacts the sensor 30 before the medium 5 contacts the sensor 30. Here, before the medium 5 passes through the support device 20, a magnetic flux detected by the sensor 30 may not be changed or be changed in a range less than a reference range. For convenience of description, for example, FIG. 8 illustrates that a magnetic flux is not changed before the medium 5 contacts the sensor 30.

The transferring medium 5 passes between the first guide 412 and the first support part 229*a*. Then, the support units 221 and 222 are rotated in one direction (in a clockwise direction with respect to FIG. 1) with respect to the shaft 223 by a load of the medium 5. Then, the second support part 229*b* is spaced from the sensor 30.

In case where the paper dust is smeared on the second support part 229*b*, a magnetic flux change is detected when the second support part 229*b* is spaced from the sensor 30. Thus, data having a waveform shown as a reference symbol A of FIG. 8 is outputted from the sensor 30 (the magnetic flux may be changed in a range greater or less than the reference range). Of course, in a state where the paper dust does not remain on the second support part 229*b*, a waveform of the output data of the sensor 30 is not changed.

Next, when the medium 5 is disposed initially on the second support part 229*b*, the magnetic flux is detected through the sensor 30 by the paper dust of the medium 5 to output data having a waveform shown as a reference symbol B of FIG. 8. Although the magnetic flux is not changed or even though the magnetic flux is changed while the medium 5 passes through the second support part 229*b*, the magnetic flux is changed in a range less than the reference range. For convenience of description, for example, FIG. 8 illustrates that the magnetic flux is not changed while the medium 5 passes through the second support part 229*b*.

Since the magnetic flux change (the magnetic flux is changed in a range greater than the reference range) is detected by the sensor 30 at a moment at which a rear end of the medium 5 completely passes through the second support part 229*b*, data having a waveform as shown as a reference symbol C of FIG. 8 is outputted through the sensor 30.

In the current embodiment, whether the medium is genuine is determined based on a reference time range required when the medium passes through the sensor. If the waveform is not changed or is changed in a range less than the reference range, the medium 5 may be determined as a counterfeit. Also, in case where the waveform is changed two or more times, when a time difference between time points (time points at which the waveforms are changed in a range greater than the reference range) at which two waveforms adjacent to each other are changed out of the reference time range, the medium 5 may be determined as a counterfeit. On the other hand, in case where the waveform is changed two or more times during the transfer of the medium 5, when a time difference between time points (time points at which the waveforms are changed in a range greater than the reference range) at which two waveforms adjacent to each other are changed within the reference time range, the medium 5 may be determined as a genuine.

When the medium 5 completely passes through the third support part 229*c*, a force applied to the support device 20 is removed. Thus, the support units 221 and 222 are rotated in the other direction (in a counter clockwise direction with reference to FIG. 7) with respect to the shaft 223 by the restoring force of the elastic member 240. Thus, the second support part 229*b* contacts the sensor 30. Here, when the paper dust remains on the second support part 229*b*, the magnetic flux is changed while the second support part 229*b* contacts the sensor 30. Thus, data having a waveform shown as a reference symbol D of FIG. 8 is outputted through the sensor 30. Of course, in a state where the paper dust does not remain on the second support part 229*b*, a waveform of the output data of the sensor 30 is not changed.

According to the current embodiment, even though the paper dust remains on the second support part 229*b*, sensing errors due to the paper dust of the medium may be prevented.

Although the first and second support parts are respectively disposed at the front and rear sides of the second support part in the specification, an additional support part may be disposed at only the front side or only the rear side of the second support part. In this case, the other support part except the second support part may be called the first support part.

Even though all the elements of the embodiments are coupled into one or operated in the combined state, the present disclosure is not limited to such an embodiment. That is, all the elements may be selectively combined with each other without departing the scope of the invention. Furthermore, when it is described that one comprises (or comprises or has) some elements, it should be understood that it may comprise (or include or has) only those elements, or it may comprise (or include or have) other elements as well as those elements if there is no specific limitation. Unless otherwise specifically defined herein, all terms including technical or scientific terms are to be given meanings understood by those skilled in the art. Like terms defined in dictionaries, generally used terms need to be construed as meaning used in technical contexts and are not construed as ideal or excessively formal meanings unless otherwise clearly defined herein.

Although embodiments have been described with reference to a number of illustrative embodiments thereof, it will be understood by those skilled in the art that various changes in form and details may be made therein without departing from the spirit and scope of the invention as defined by the appended claims. Therefore, the preferred embodiments should be considered in descriptive sense only and not for purposes of limitation, and also the technical scope of the invention is not limited to the embodiments. Furthermore, is defined not by the detailed description of the invention but by the appended claims, and all differences within the scope will be construed as being comprised in the present disclosure.

What is claimed is:

1. A medium process apparatus comprising:

a state detection unit configured to detect a state of a transferring medium; and a support unit configured to support the transferring medium, wherein the support unit comprises a plurality of support parts successively disposed in a transfer direction of the medium, wherein the plurality of support parts comprise a second support part facing the state detection unit, a first support part disposed at a front side of the second support part and a third support part disposed at a rear side of the second support part in the transfer direction of the medium, wherein the first and third support parts are adjacent to the second support part, wherein the second support part overlaps the state detection unit, wherein the first and third support parts do not overlap the state detection unit in a direction perpendicular to the transfer direction of the medium, wherein the second support part contacts the state detection unit before the medium is supported by the first support part, wherein the medium contacts the state detection unit while the medium is supported by the second support part, and wherein the second support part contacts the state detection unit again after the medium completely passes through the third support part.

2. The medium process apparatus of claim 1, wherein the first to third support parts are rounded or have one or more inclined surfaces.

3. The medium process apparatus of claim 1, further comprising a first guide facing the first support part and a second guide facing the third support part, wherein the first and second guides are disposed on a transfer path of the medium.

4. The medium process apparatus of claim 3, further comprising first and second path formation parts for defining the transfer path of the medium, wherein the first and second guides are integrated with or coupled to one of the first and second path formation parts.

5. The medium process apparatus of claim 3, further comprising a housing for supporting the state detection unit, wherein the first and second guides are integrated with or coupled to the housing.

6. The medium process apparatus of claim 3, wherein the state detection unit comprises a sensor, and a surface contacting the medium of each of the guides is disposed on the same level as a medium contact surface of the sensor.

7. The medium process apparatus of claim 3, wherein each of the guides is rounded or has one or more inclined surfaces.

8. The medium process apparatus of claim 1, wherein a spaced distance between the second support part and the state detection unit is L1 before the medium is supported by the first support part, a spaced distance between the second support part and the state detection unit is L2 greater than L1 while the medium is supported by the second support part, and a spaced distance between the second support part and the state detection unit is L1 again after the medium completely passes through the third support part.

9. The medium process apparatus of claim 1, wherein the state detection unit detects magnetism of the medium.

10. The medium process apparatus of claim 1, further comprising:

an installation part configured to rotatably support the support unit; and an elastic member configured to elastically support the support unit, wherein the support unit comprises:

a shaft disposed on the installation part;

a first extension part extending upward from the shaft; and a second extension part extending downward from the shaft, the second extension part being supported by the elastic member, wherein each of the support parts is disposed on the first extension part.

11. A medium process apparatus comprising:

a state detection unit configured to detect a state of a transferring medium; and a support unit configured to compress the transferring medium toward the state detection unit, wherein the medium passes between the state detection unit and the support unit, the support unit contacts the state detection unit before the medium is supported by the support unit, the support unit is spaced from the state detection unit in a state where the support unit supports the medium, and the support unit is spaced from the state detection unit when the medium is not disposed between the state detection unit and the support unit in the state where the support unit supports the medium;

wherein the support unit comprises a second support part overlapping the state detection unit, a first support part disposed at a front side of the second support part and adjacent to the second support part, and a third support part disposed at a rear side of the second support part and adjacent to the second support part; and wherein the first and third support parts do not overlap the state detection unit in a direction perpendicular to a transfer direction of the medium.

12. The medium process apparatus of claim 11, further comprising a first guide facing the first support part and a second guide facing the third support part, wherein the first guide and second guide are disposed on a transfer path of the medium.

13. The medium process apparatus of claim 11, wherein the state detection unit detects magnetism of the medium.

14. The medium process apparatus of claim 11, further comprising:

an installation part configured to rotatably support the support unit; and an elastic member configured to elastically support the support unit.

15. A financial device comprising:

a transfer path configured to transfer a medium; and a medium process apparatus configured to detect a state of the medium on the transfer path, wherein the medium process apparatus comprises:

a state detection unit configured to detect a state of the medium;

a support unit configured to compress the medium toward the state detection unit;

an installation part on which the support unit is rotatably disposed; and an elastic member configured to apply an elastic force to the support unit disposed on the installation part, wherein the support unit comprises first, second, and third support parts successively disposed in a transfer direction of the medium, wherein the second support part overlaps the state detection unit, wherein the first and third support parts are adjacent to the second support part, and wherein the first and third support parts do not overlap the state detection unit in a direction perpendicular to the transfer direction of the medium.

16. The financial device of claim 15, further comprising a guide disposed on the transfer path of the medium, the guide facing a support part except the support part facing the state detection unit.

17. The medium process apparatus of claim 1, wherein the second support part is disposed under the state detection unit.

18. The medium process apparatus of claim 11, wherein the second support part is disposed under the state detection unit.

19. The financial device of claim 15, wherein the second support part is disposed under the state detection unit.

* * * * *